(12) United States Patent
Panthofer et al.

(10) Patent No.: US 7,399,264 B2
(45) Date of Patent: Jul. 15, 2008

(54) HIGH FREQUENCY INDUCTION WELDING OF AUSTENITIC STAINLESS STEEL FOR PRESSURE VESSEL TUBING

(75) Inventors: William E. Panthofer, Jackson, TN (US); Michael P. Fisch, West Seneca, NY (US)

(73) Assignee: Mill Masters, Inc., Jackson, TN (US)

( * ) Notice: Subject to any disclaimer, the term of this patent is extended or adjusted under 35 U.S.C. 154(b) by 0 days.

(21) Appl. No.: 11/162,558

(22) Filed: Sep. 14, 2005

(65) Prior Publication Data
US 2006/0081613 A1    Apr. 20, 2006

Related U.S. Application Data

(60) Provisional application No. 60/522,302, filed on Sep. 14, 2004.

(51) Int. Cl.
*B23K 13/02* (2006.01)
*B31C 3/04* (2006.01)

(52) U.S. Cl. .............. 493/274; 493/269; 493/292; 228/17.5; 228/147; 219/216; 219/59.1

(58) Field of Classification Search ............ 493/163, 493/269, 274, 292; 228/147, 141.1, 17.5, 228/214, 219, 228; 219/59.1, 612
See application file for complete search history.

(56) References Cited

U.S. PATENT DOCUMENTS

| | | | |
|---|---|---|---|
| 3,689,725 A * | 9/1972 | Hammer et al. ............ 219/613 |
| 4,268,736 A | 5/1981 | Cuvelier ................... 219/8.5 |
| 4,406,167 A | 9/1983 | Maeda ....................... 73/622 |
| 4,523,072 A | 6/1985 | Nakate et al. ............... 219/67 |
| 5,121,872 A * | 6/1992 | Legget ...................... 228/148 |
| 5,915,421 A * | 6/1999 | Borzym et al. ............ 138/142 |
| 6,018,859 A * | 2/2000 | Borzym et al. ............ 29/458 |
| 6,223,407 B1 * | 5/2001 | Staschewski et al. ...... 29/33 D |
| 2004/0228967 A1 * | 11/2004 | Leung et al. ............... 427/180 |

* cited by examiner

*Primary Examiner*—Brian D. Nash
*Assistant Examiner*—Gloria R. Weeks
(74) *Attorney, Agent, or Firm*—Hartman & Hartman, P.C.; Gary M. Hartman; Domenica N. S. Hartman

(57) ABSTRACT

A process for producing high pressure tubing from austenitic stainless steels. The process entails passing a continuous austenitic stainless steel strip through pre-weld rolls enclosed in a forming housing to produce a continuous tubular shape having opposing edges separated by a longitudinal gap. While the gap is maintained with a seam guide and a liquid-free gas mixture of an inert gas and a gaseous flux is directed at the gap and into an interior of the tubular shape, the tubular shape is caused to pass through a high frequency induction coil to cause heating of the opposing edges of the tubular shape. Pressure is then applied to the tubular shape with weld rolls to force the opposing edges together and form a continuous tubing having a continuous butt weld joint. The weld joint is then quenched with an inert gas without the assistance of a liquid coolant.

19 Claims, 1 Drawing Sheet

HIGH FREQUENCY INDUCTION WELDING OF AUSTENITIC STAINLESS STEEL FOR PRESSURE VESSEL TUBING

CROSS REFERENCE TO RELATED APPLICATIONS

This application claims the benefit of U.S. Provisional Application No. 60/522,302, filed Sep. 14, 2004, the contents of which are incorporated herein by reference.

BACKGROUND OF THE INVENTION

The present invention generally relates to the production of steel tubing. More particularly, this invention relates to a process of producing high pressure tubing of austenitic stainless steels using a high frequency induction welding process.

In typical high frequency tube welding processes, a strip of mild steel is passed through several sets of steel rolls to form the strip into a tubular shape having a longitudinal open seam, which is then passed through a high frequency induction coil that welds the seam to produce the desired tube shape. The induction coil generates eddy currents in the tubular shape, with the induced current density being highest at the edges of the seam to cause rapid heating of the edges. Thereafter, pressure (weld) rolls press the edges of the seam together to form a butt weld joint. The efficiency of the welding process is improved by positioning a ferrite rod (impeder) within the tube at the welding location to reduce the current flowing around the inside surface of the tubular shape and thereby promote current flow along seam edges.

While induction welding methods have worked well for producing mild steel tubing, difficulties can be encountered when attempting to produce austenitic stainless steel tubing for high pressure applications, such as coolant tubes for heat exchanger systems. Examples include tubes formed of Type 300 and 900 stainless steels and intended to have tube diameters of about 8 to 26 mm and wall thicknesses of 0.127 to 0.76 mm. Problems encountered include leaks, low strength, and poor corrosion resistance within the weld joint. Consequently, the production of austenitic stainless steel tubing by induction welding processes has typically been limited to decorative or otherwise non-pressure applications, while tungsten inert gas (TIG) welding processes have typically been the process of choice for producing high pressure tubing formed of austenitic stainless steels. However, TIG welding processes generally require relatively low throughput (e.g., about six to thirty fpm (about two to ten meters/minute), as compared to induction welding process that are capable of line speeds of 100 fpm (about 30 meters/minute) and above.

BRIEF SUMMARY OF THE INVENTION

The present invention provides a process for producing high pressure tubing from austenitic stainless steels. The process entails passing a continuous austenitic stainless steel strip through one or more sets of pre-weld rolls to produce a continuous tubular shape having opposing edges separated by a longitudinal gap therebetween. The pre-weld rolls are enclosed in a forming housing, such that the forming step is performed within the forming housing. While the gap is maintained with a seam guide and a liquid-free gas mixture of an inert gas and a gaseous fluxing agent is directed at the gap and into an interior of the tubular shape, the continuous tubular shape is caused to pass through a high frequency induction coil that generates eddy currents in the opposing edges of the tubular shape to cause heating of the opposing edges. The induction coil is operated at a frequency of about 400 to about 1100 KHz and is enclosed in a weld housing so that the weld and forming housings are thermally insulated from each other. Pressure is then applied to the tubular shape with weld rolls located within the weld housing to force the opposing edges together and form a continuous tubing having a continuous butt weld joint. The weld joint is then quenched with an inert gas without the assistance of a liquid coolant.

A significant advantage of this invention is that the resulting tubing and its weld joint are essentially free of metallurgical flaws or discontinuities, and the tubing is suitable for use as a conduit in high pressure applications.

Other objects and advantages of this invention will be better appreciated from the following detailed description.

DETAILED DESCRIPTION OF THE INVENTION

Figure 1:
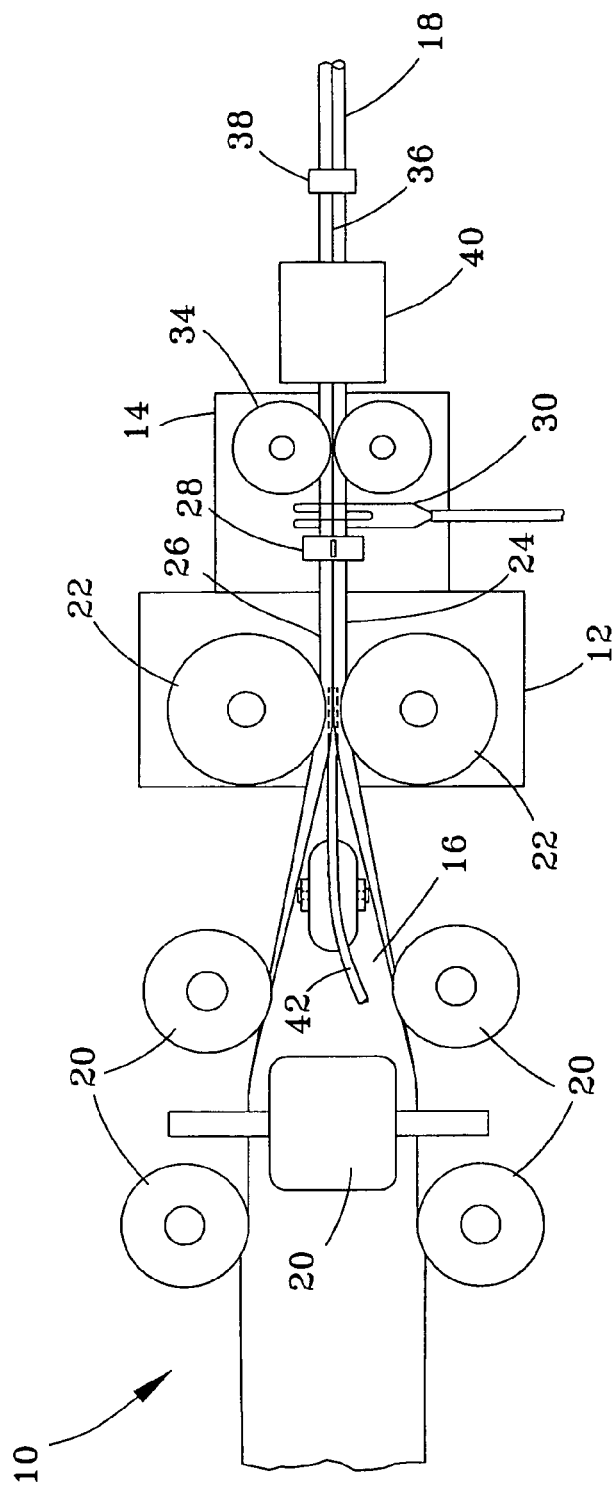
FIG. 1 schematically represents a high frequency induction welding apparatus in accordance with a preferred embodiment of this invention.

Schematically illustrated in FIG. 1 is a high frequency induction welding apparatus 10 in accordance with a preferred embodiment of the invention. The apparatus 10 generally includes a forming housing 12 and a weld housing 14 in series and within which a metal strip 16 undergoes forming and welding, respectively, to produce tubing 18 suitable for use in high pressure applications. The strip 16 is formed of a Type 300 or 900 austenitic stainless steel, such as Type 304, 304L, 316, 316L, 321, and 903. Tubing 18 with diameters of about 8 to 26 mm and wall thickness of about 0.127 to 0.76 mm can be produced with the apparatus 10, with smaller and larger tubes sizes also being foreseeable. Suitable linear speeds for the strip 16 are on the order of about 100 to about 600 feet per minute (about 30 to 200 meters per minute), with lesser and greater speeds being foreseeable.

Figure 2:
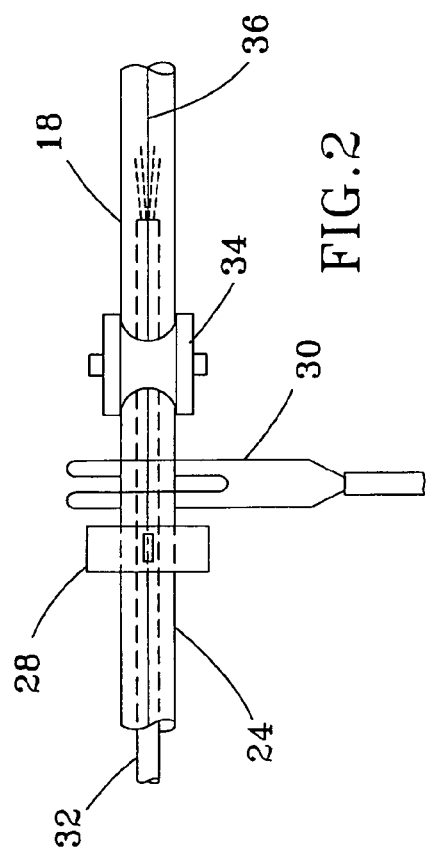
FIG. 2 is a schematic detailed view of a welding area of the apparatus of FIG. 1 in accordance with one embodiment of the invention.

The strip 16 undergoes forming by a series of forming rolls 20 and a pair of pre-weld rolls 22, the latter of which are shown located within the forming housing 12. In accordance with known practice, the forming rolls 20 and pre-weld rolls 22 plastically deform the strip 16 to yield a tubular shape 24 having a longitudinal gap 26 separating a pair of opposing edges. Thereafter, the tubular shape 24 proceeds to the weld housing 14 that contains an adjustable gap seam guide 28 for maintaining the gap 26 at a suitable width for the welding operation, as known and practiced in the art. The seam guide 28 can be a fixed or roller-type, and is preferably formed of a ceramic or other nonmagnetic material that resists wear when in rubbing contact with the edges of the stainless steel tubular shape 24. Within the weld housing 14, the tubular shape 24 undergoes resistance welding with a high frequency induction coil 30 of a type known and commercially available. The induction coil 30 is sized to generate sufficient heat within a localized region of the tubular shape 24 to enable metallurgical joining of its edges. As known in the art, heating occurs as a result of the resistance to the flow of an induced electrical current produced by the coil 30 and concentrated along the edges of the tubular shape 24. Heating of the edges is preferably further concentrated with the assistance of an internal ferrite impeder 32 (FIG. 2). Suitable weld frequencies are believed to be in a range of about 400 to 1100 KHz, and more preferably about 700 to 1100 KHz, such as about 725 KHz.

Immediately downstream of the coil 30, a pair of weld rolls 34 squeeze the edges of the tubular shape 24 together to produce a butt weld joint 36. No filler material is added by the welding operation, such that the metal composition of the weld joint 36 is the same as the strip 16. The resulting tubing 18 can be cooled within a housing 40, preferably into which a shielding gas is injected. Liquid coolants are avoided to eliminate contaminants such as calcium, oxygen and carbon. The tubing 18 may then pass through a weld scarfing station 38 to remove a small amount of weld flash on the outside of the tubing 18 before the tubing 18 undergoes further processing as known in the art (not shown). Downstream of the weld rolls 34, the tubing 18 may be supported by sets of horizontal rolls (not shown) for the purpose of keeping slight pressure on the weld joint 36 until the joint 36 sufficiently solidifies to avoid the formation of cracks and intergranular voids in the weld joint 36.

According to a preferred aspect of the invention, in addition to being free of oils and other contaminants normally avoided for welding processes, the tubular shape 24 while subjected to heating is also maintained free of any liquids, including liquid fluxes and coolants, the latter of which is typically used to maintain the components of an induction welding apparatus at acceptable temperatures. Most notably, the surfaces of the tubular shape 24 subjected to heating by the induction coil 30 are flooded with a gas mixture 42 preferably containing an inert gas (such as argon) and a gaseous flux as represented in FIG. 2. A preferred gaseous flux can be generated by evaporating a fluxing agent commercially available under the name Liquid Gasflux® from The Gasflux Company. Liquid Gasflux® is reported to contain, by weight, about 55% trimethylborate, about 25% acetone, and about 20% methanol, and conventionally has been used, for example, with oxy-acetylene equipment to perform brazing operations in which acetylene is passed through the Gasflux solution to entrain a vapor of the solution.

Further cooling can be achieved by, for example, flowing a coolant through the walls of the weld housing 14, the pre-weld rolls 22, the weld rolls 34, and the shafts on which the rolls 22 and 34 are mounted for rotation. For example, each of these can be cooled with appropriate closed-loop cooling systems (not shown). The impeder 32 is also preferably cooled. The size of the impeder 32 and the type of coolant system used is believed to depend on the size of the tubular shape 24. For tubular shapes with internal diameters of about 0.5 inch (about 1.3 cm) or larger, a return flow impeder 32 can be used. For smaller tubular shapes, a return flow or non-return flow impeder 32 is preferably used. In accordance with the desire to avoid liquid contamination, if a non-return flow impeder 32 is used as represented in FIG. 2, the coolant (e.g., water) discharged from the impeder 32 must be a sufficient distance downstream from the coil 30 to avoid generating steam that would contaminate the hot portion of the tubular shape 24. In practice, a distance of about twelve to sixty inches (about 0.25 to about 1.5 m) from the welding zone appears to be sufficient.

Tubing produced in accordance with this invention has been shown to be capable of tube expansion up to about 41% without anneal. The invention was reduced to practice with an apparatus 10 generally as represented in FIG. 1 and a process as generally described above. In one example, the tubing produced was formed of Type 304L austenitic stainless steel to have an outer diameter of about ⅝ inch (about 16 mm) and a wall thickness of about 0.013 inch (about 0.33 mm). Visual examination of the tubing evidenced slight discoloration in the area of the longitudinal butt weld joint, with no welding discontinuities being evident. A transverse metallographic section prepared from the tubing evidenced that no weld discontinuities were present. The weld joint was narrow as typical for weldments produced by high frequency induction welding processes. Abnormalities were not observed in the weld joint or the adjacent heat-affected zones (HAZ) that would appear to negatively affect the mechanical properties or corrosion resistance of the tubing. A microhardness traverse was made at approximately mid-wall starting about 0.020 inch (about 0.5 mm) to one side of the weld joint and proceeding to about 0.020 inch on the opposite side of the weld joint. Measured hardnesses were about 98 Rockwell B to about 24 Rockwell C, with no significant hardness change present in the weld joint or the HAZ in comparison to the base metal.

While the invention has been described in terms of a preferred embodiment, it is apparent that other forms could be adopted by one skilled in the art. Therefore, the scope of the invention is to be limited only by the following claims.

What is claimed is:

1. A process of producing high pressure tubing from austenitic stainless steel, the process comprising the steps of:
    causing a continuous austenitic stainless steel strip to pass through pre-weld rolls to produce a continuous tubular shape having opposing edges separated by a longitudinal gap therebetween, the pre-weld rolls being enclosed in a forming housing;
    maintaining the gap with a seam guide inserted into the gap;
    while directing a liquid-free gas mixture of an inert gas and a gaseous fluxing agent at the gap and into an interior of the tubular shape, causing the continuous tubular shape to pass through a high frequency induction coil that generates eddy currents in the opposing edges of the tubular shape to cause heating of the opposing edges while surfaces of the tubular shape subjected to heating by the induction coil are flooded with the liquid-free gas mixture, the induction coil operating at a frequency of about 400 to about 1100 KHz and being enclosed in a weld housing so that the weld and forming housings are thermally insulated from each other;
    applying pressure to the tubular shape with weld rolls to force the opposing edges together to form a continuous tubing having a continuous butt weld joint, the weld rolls being mounted on weld roll shafts and enclosed with the induction coil in the weld housing; and
    quenching the butt weld joint with an inert gas without the assistance of liquid;
    wherein the gaseous fluxing agent consists essentially of trimethylborate, acetone, and methanol.

2. The process according to claim 1, further comprising the step of positioning an impeder in the tubular shape at a location of the tubular shape subjected to the induction coil.

3. The process according to claim 2, wherein the impeder is cooled with a coolant flowing therethrough.

4. The process according to claim 1, wherein the induction coil is operating at a frequency of about 700 to about 1100 KHz.

5. The process according to claim 1, wherein the induction coil is operating at a frequency of about 725 KHz.

6. The process according to claim 1, wherein the strip, tubular shape, and tubing travel at a linear speed of at least 100 feet/minute.

7. The process according to claim 1, wherein the gas mixture consists essentially of the inert gas and the gaseous fluxing agent.

8. The process according to claim 1, wherein the gaseous fluxing agent consists essentially of, by weight, about 55% trimethylborate, about 25% acetone, and about 20% methanol.

9. The process according to claim 1, further comprising the step of flowing a coolant through the pre-weld rolls and pre-weld roll shafts on which the pre-weld rolls are mounted.

10. The process according to claim 1, further comprising the step of flowing a coolant through the weld rolls and weld roll shafts on which the weld rolls are mounted.

11. A process of producing high pressure tubing from austenitic stainless steel, the process comprising the steps of:
 causing a continuous austenitic stainless steel strip to pass through pre-weld rolls to produce a continuous tubular shape having opposing edges separated by a longitudinal gap therebetween, the pre-weld rolls being enclosed in a forming housing;
 maintaining the gap with a seam guide inserted into the gap;
 providing a liquid-free gas mixture consisting essentially of an inert gas and a gaseous fluxing agent that consists essentially of trimethylborate, acetone, and methanol;
 while directing the liquid-free gas mixture at the gap and into an interior of the tubular shape, causing the continuous tubular shape to pass through a high frequency induction coil that generates eddy currents in the opposing edges of the tubular shape to cause heating of the opposing edges, the induction coil operating at a frequency of about 400 to about 1100 KHz and being enclosed in a weld housing so that the weld and forming housings are thermally insulated from each other;
 applying pressure to the tubular shape with weld rolls to force the opposing edges together to form a continuous tubing having a continuous butt weld joint, the weld rolls being mounted on weld roll shafts and enclosed with the induction coil in the weld housing; and
 quenching the butt weld joint with an inert gas without the assistance of a liquid coolant.

12. The process according to claim 11, wherein surfaces of the tubular shape are flooded with the gas mixture while subjected to heating by the induction coil.

13. The process according to claim 11, wherein the butt weld joint is quenched without the assistance of any liquid.

14. The process according to claim 11, further comprising the step of positioning an impeder in the tubular shape at a location of the tubular shape subjected to the induction coil.

15. The process according to claim 14, wherein the impeder is cooled with a coolant flowing therethrough.

16. The process according to claim 14, wherein the induction coil is operating at a frequency of about 700 to about 1100 KHz.

17. The process according to claim 11, wherein the gaseous fluxing agent consists essentially of, by weight, about 55% trimethylborate, about 25% acetone, and about 20% methanol.

18. The process according to claim 11, further comprising the step of flowing a coolant through the pre-weld rolls and pre-weld roll shafts on which the pre-weld rolls are mounted.

19. The process according to claim 11, further comprising the step of flowing a coolant through the weld rolls and weld roll shafts on which the weld rolls are mounted.

* * * * *